United States Patent
Brei et al.

(10) Patent No.: US 7,376,709 B1
(45) Date of Patent: May 20, 2008

(54) METHOD FOR CREATING DURABLE WEB-ENABLED UNIFORM RESOURCE LOCATOR LINKS

(75) Inventors: James Brei, Milford, MI (US); Mark Holt, Dexter, MI (US); Ken Olson, Ann Arbor, MI (US); Sri Potharaju, Ann Arbor, MI (US)

(73) Assignee: ProQuest, Ann Arbor, MI (US)

( * ) Notice: Subject to any disclaimer, the term of this patent is extended or adjusted under 35 U.S.C. 154(b) by 1089 days.

(21) Appl. No.: 10/142,248

(22) Filed: May 9, 2002

(51) Int. Cl.
*G06F 15/16* (2006.01)
(52) U.S. Cl. .......................... 709/218; 707/3
(58) Field of Classification Search ............... 709/203, 709/217, 226, 218; 713/155–158; 707/3–6
See application file for complete search history.

(56) References Cited

U.S. PATENT DOCUMENTS

| | | | | |
|---|---|---|---|---|
| 5,544,049 | A * | 8/1996 | Henderson et al. ............. 707/3 |
| 5,708,780 | A * | 1/1998 | Levergood et al. ......... 709/229 |
| 5,774,660 | A * | 6/1998 | Brendel et al. .............. 709/201 |
| 5,778,362 | A * | 7/1998 | Deerwester .................... 707/5 |
| 5,812,776 | A * | 9/1998 | Gifford ........................ 709/217 |
| 5,864,676 | A * | 1/1999 | Beer et al. ................... 709/229 |
| 5,903,892 | A * | 5/1999 | Hoffert et al. ................ 707/10 |
| 5,905,862 | A * | 5/1999 | Hoekstra ..................... 709/202 |
| 5,924,090 | A * | 7/1999 | Krellenstein .................. 707/5 |
| 5,940,821 | A * | 8/1999 | Wical ............................ 707/3 |
| 5,960,429 | A * | 9/1999 | Peercy et al. ................ 709/217 |
| 6,000,033 | A * | 12/1999 | Kelley et al. ............... 709/225 |
| 6,145,003 | A * | 11/2000 | Sanu et al. ................. 709/225 |
| 6,167,453 | A * | 12/2000 | Becker et al. .............. 709/245 |
| 6,173,406 | B1 * | 1/2001 | Wang et al. ................. 709/223 |
| 6,253,198 | B1 * | 6/2001 | Perkins ....................... 709/218 |
| 6,260,111 | B1 * | 7/2001 | Craig et al. ................. 711/115 |
| 6,321,228 | B1 * | 11/2001 | Crandall et al. ............ 709/218 |
| 6,377,961 | B1 * | 4/2002 | Ryu ............................ 709/217 |
| 6,377,983 | B1 * | 4/2002 | Cohen et al. ............... 709/217 |
| 6,490,577 | B1 * | 12/2002 | Anwar .......................... 707/3 |
| 6,547,829 | B1 * | 4/2003 | Meyerzon et al. ............ 707/10 |
| 6,574,625 | B1 * | 6/2003 | Bates et al. ................. 709/217 |
| 6,615,247 | B1 * | 9/2003 | Murphy ....................... 709/217 |
| 6,631,369 | B1 * | 10/2003 | Meyerzon et al. ............. 707/4 |
| 6,636,853 | B1 * | 10/2003 | Stephens, Jr. ............... 709/203 |

(Continued)

OTHER PUBLICATIONS

RFC 1738, Uniform Resource Locators (URL), Dec. 1994.*

(Continued)

*Primary Examiner*—Jason D Cardone
*Assistant Examiner*—Ajay Bhatia
(74) *Attorney, Agent, or Firm*—Patula & Associates, P.C.

(57) ABSTRACT

The present invention is a process of creating durable Uniform Resource Locator links to results of performing web-enabled functions. The web-enabled functions are performed using a system delivered user interface requiring users to authenticate within the system. After authentication, the user will be able to perform a first user function that will create Uniform Resource Locator link results derived from the first user function. The user will then be able to conduct successive users functions, either dependent or independent of the first user function results without having to re-authenticate. The successive user function will then create durable Uniform Resource Locator link results derived from the successive user function without altering the previously created Uniform Resource Locator links to previous user function results.

7 Claims, 1 Drawing Sheet

U.S. PATENT DOCUMENTS

| | | | |
|---|---|---|---|
| 6,638,314 B1* | 10/2003 | Meyerzon et al. | 707/10 |
| 6,654,749 B1* | 11/2003 | Nashed | 707/10 |
| 6,745,224 B1* | 6/2004 | D'Souza et al. | 709/202 |
| 7,055,169 B2* | 5/2006 | Delpuch et al. | 725/100 |
| 2001/0039546 A1* | 11/2001 | Moore et al. | 707/10 |
| 2002/0007460 A1* | 1/2002 | Azuma | 709/229 |
| 2002/0019828 A1* | 2/2002 | Mortl | 707/200 |
| 2002/0049756 A1* | 4/2002 | Chua et al. | 709/217 |
| 2002/0143759 A1* | 10/2002 | Yu | 707/5 |
| 2003/0041123 A1* | 2/2003 | Sato et al. | 709/219 |
| 2003/0123443 A1* | 7/2003 | Anwar | 370/392 |
| 2003/0220885 A1* | 11/2003 | Lucarelli et al. | 705/64 |
| 2004/0025180 A1* | 2/2004 | Begeja et al. | 725/46 |
| 2004/0054667 A1* | 3/2004 | Kake et al. | 707/3 |
| 2004/0054920 A1* | 3/2004 | Wilson et al. | 713/200 |
| 2004/0133469 A1* | 7/2004 | Chang | 705/14 |
| 2005/0076033 A1* | 4/2005 | Foo | 707/10 |
| 2005/0080770 A1* | 4/2005 | Lueder et al. | 707/3 |
| 2005/0097107 A1* | 5/2005 | Burt | 707/100 |
| 2006/0212481 A1* | 9/2006 | Stacey et al. | 707/104.1 |
| 2007/0038641 A1* | 2/2007 | Fawcett et al. | 707/10 |

OTHER PUBLICATIONS

Networked information flows in Asia: the research uses of the AltaVista search engine and "weblinksurvey" software, Dr T Matthew Ciolek, Sep. 14-15, 2001.*

Michel, B.S.; Nikoloudakis, K.; Reiher, P.; Lixia Zhang, "URL forwarding and compression in adaptive Web caching," INFOCOM 2000. Nineteenth Annual Joint Conference of the IEEE Computer and Communications Societies. Proceedings. IEEE , vol. 2, no., pp. 670-678 vol. 2, 2000.*

Natalie S. Glance, "Community search assistant",Proceedings of the 6th international conference on Intelligent user interfaces, 2001, Santa Fe, New Mexico, United States Jan. 14-17, 2001.*

* cited by examiner

METHOD FOR CREATING DURABLE WEB-ENABLED UNIFORM RESOURCE LOCATOR LINKS

The present invention relates generally to web-based browsing and searching capabilities. More particularly, the present invention relates to a method of performing multiple user function requests, such as searching, browsing, printing, and retrieving documents, in a web-enabled environment that requires user authentication and authorization for user access which further provides process distribution. Specifically, the invention relates to the creation of durable Uniform Resource Locator (URL) link results incorporating search results derived from user-performed functions and user authentication information. The link can be placed in a table that would map links with logical locations of the place to which it refers. As the location changes, the links would remain persistent. A generic "Master Link" can be created that will contain certification parameters, but no search parameters.

BACKGROUND OF THE INVENTION

In existing user interfaces utilized in web-enabled information systems, the user is restricted to the use of the user interface as a whole. Specifically, the user cannot independently use one interface function, such as document retrieval functions, without introducing other user functions, such as document search functions. In most existing user interfaces, when document retrieval functions are enabled, the user interface automatically introduces other user functions, such as search by word, search by file, or search by publication, even if these functions are not desired. This limitation is the result of the underlying information system that supports such web-enabled user interfaces. These systems typically require the input of user authentication dependent sessions, which record the user's login information as well as authorization and accounting information about the specific functions conducted by the user.

A user is typically required to perform all of his desired functions within one authentication session. The user may be able to open separate independent sessions, but the user must provide the same authentication information for each additional session that he/she performs. Within each session, the user is limited to the results of his existing function request. Specifically, if the user has performed a function request and has obtained a specific function result, the user cannot perform successive function requests without replacing the first performed function results. Consequently, the user must perform the same authentication function multiple times if he/she needs to move between multiple function request types.

An example of this feature is if a user has performed a search by word function for "astronomy" and retrieves a list of articles related to "Galileo" and "Copernicus". The user will not be able to perform a successive search for "Copernicus" alone without replacing the links to the list of articles on the original "astronomy" search request. If the search by word function for "Copernicus" does not satisfy the user, the user must again perform a search by word function for "astronomy" to get back to the original list. As such, in order to perform a subsequent search, a user must actually perform 2 additional searches; one search for the Copernicus articles and the other search to get the user back to where they started.

The present invention overcomes such session limitations by creating a user interface that allows the creation of durable URL links to function results which are available to the user at any time. These durable URL links are not altered by successive user functions, therefore the user does not need to perform repetitious functions to arrive at a prior function.

U.S. Pat. No. 5,982,370 to Kamper, issued on Nov. 9, 1999, discloses the ability of a web-enabled system to allow a user to select certain phrases or words within a document and then present the user with the ability of performing a keyword search dependent upon such selected words or phrases. The '370 patent further discloses the system's ability to return the search results and subsequently allows the user to perform further keyword searches on the returned document. However, a primary limitation within such a system is that it does not account for allowing multiple searches under one account name, such as the present invention. The '370 system assumes that the primary searches, and subsequent searches conducted upon the primary search, are within a public account not requiring authentication to returned documents, whereas the present invention is intended to require a user authentication for access and accounting information.

U.S. Pat. No. 5,925,106 to Nielsen, issued on Jul. 20, 1999, discloses a web server's ability to automatically place conventional bookmarks within a web browser. The bookmarks disclosed within the '106 invention incorporate the web server's address information within a simple link with a common title structure. As such, when the user desires to revisit the bookmarked Internet site, the user simply selects the saved bookmark and does not need to retype the original web server address information. However, a limitation of the U.S. Pat. No. 5,925,106 is that it does not provide for multiple searches to be conducted on a single returned search under the same authentication information, unlike the present invention which can allow multiple function requests within the same user authentication.

In addition, the present invention provides a mechanism whereby users can create a "Master Link" without specific search parameters, effectively creating a generic Durable Link stem which includes certification information but no search parameters. Users can then use the Durable Link stem to create a large number of specific searches without having to regenerate each Durable Link in a separate process. Further, a table would map Durable links with the logical locations of the content or products to which they refer. This would allow content to be moved around, products to change URLs and so forth without breaking the Durable Link.

U.S. Pat. No. 6,167,409 to DeRose et al., issued on Dec. 26, 2000, discloses the ability of a web-enabled system to deliver only partial documents based upon the user's desired search requests. This is in lieu of transferring the whole document through the system, wherein the user would have to manually locate the desired information within the document. However, a limitation within the '409 patent is that it does not allow for pyramidal searching capabilities under a single authorization, unlike the present invention which does allow pyramidal function request capabilities.

U.S. Pat. No. 5,922,045 to Hanson, issued on Jul. 13, 1999, discloses a web-enabled service that automatically tracks a user's progression through an audio enabled document. As such, when the user exits the document before reaching the end, the system will automatically record a bookmark and the user's exiting location. When the user returns to the document at a later date, the system will automatically recall the exited location and return the user to that point. However, a limitation within the '045 patent is that it does not disclose the ability to allow pyramidal searching capabilities, unlike the present invention which does allow pyramidal searching.

U.S. Pat. No. 6,112,202 to Kleinberg, issued on Aug. 29, 2000, discloses the ability of having a web-based system that allows users to conduct conventional keyword searches, returns the results of such keyword searches, and further displays related pages based upon the keyword search results. However, the '202 patent does not disclose the ability of allowing multiple searches to be conducted on successive search results, unlike the present invention which does allow successive searches.

OBJECTS OF THE INVENTION

An object of the present invention is to allow a user to perform successive user function requests without altering prior user function results by creating durable URL links.

Another object of the present invention is to allow a user to perform successive user function requests without the need to re-authenticate with each subsequent function request. The present invention advances the art of web-enabled system communications and the techniques of protocol for accessing individual documents and searches without cumbersome and undue repetitious authentication.

Another object of the present invention is to enable a user to access documents, and retrieval locations without the need for graphic user interfaces (GUI) in authentication and authorization processes. The present invention advances the art of web-enabled system communications and techniques by encrypting within the URL the retrieval locations, responses to search requests and the authentication and authorization access codes.

Yet another object of the present invention is to enable a web-enabled system operating in parallel to automatically designate web-based function processes to component systems with the least amount of process usage.

And yet another object of the present invention is to enable a web-enabled system to create durable URL links that provide static URL links to dynamic results, such as continuously updated articles and news releases. For example, the durable URL link results will be a static representation of linking information to continuously updated periodical information.

And yet another object of the present invention is to enable a web-enabled system to provide a customizable user interface which is session-less for the creation of future vertical applications such as university course material or customer search interfaces.

And yet another object of the present invention is to enable a web-enabled system to create durable URL links that creats a generic durable link which includes certification information but no search parameters.

And yet another object of the present invention is to enable a web-enabled system to create a table that would map Durable links with the logical locations of the content or products to which they refer.

Numerous other objects, features and advantages of the present invention will become readily apparent through the detailed description of the preferred embodiment and the claims.

SUMMARY OF THE INVENTION

The present invention provides a method of performing Internet and/or Intranet user functions in a web-enabled information system. The present invention allows authentication and retrieval of authorized information while not making additional graphic user interfaces (GUI) necessary. The method is as follows: the user begins by authenticating himself within the web-enabled user interface. After authentication, the user will be able to perform a first user function request; this first user function, typically a search for document, search for publication, or search by keyword, will create durable URL link results incorporating the user's initial authentication information and the linking information for the searched for documents; the user can then perform successive user function requests either independent of or based on the first user function results. However, such successive user function requests will not require the user to re-authenticate nor will they alter or destroy the original URL link results created from the first user function. Furthermore, since the user's authentication information is stored within all URL links, it is unnecessary for the user to re-enter any authentication information when performing successive user functions, such as document retrieval requests, search by keywords and the like, since the system simply obtains this information from the previous link.

Within the preferred embodiment of the present invention, the authentication information will be encrypted within the URL link result, therefore securing the authentication code from any other third person and at the same time not revealing it to the present user. For example, a user can created a durable link based on a search and then e-mail the retrieved information to a third party. The third party would then be able to access the specific content in the links without having to go through the authentication process from the beginning. The present invention would be able to encrypt this authentication and authorization along with the content references and retrieval locations without the need for unnecessary additional graphic user interfaces. This feature would also be used to search and retrieve content in an automated fashion.

Within the preferred embodiment of the present invention, the web-enabled service and/or the web-enabled service administrator will have the ability to control access to certain documents based upon the authentication information and document location information incorporated within the URL links. For example, the service administrator may institute Internet Protocol masking, which will restrict user function requests to be validated only from specific computers. This will prove valuable for a company that maintains an Extranet and would like to have the ability of certain remote individuals to have access to such information over the Internet. By using Internet Protocol masking, the service administrator will be able to allow access to such information only to authorized computers.

Another method of restricting user functions may be with time constraints. The web-enabled service will be able to control the validity of the accessible URL links either by restricting time limits when the links are valid or by placing expiration limits upon the links' validity. For example, the web-enabled service can designate certain user functions to be valid only for two hours, after which time the functions have been restricted and are no longer valid.

Yet another method of restricting user functions will be with the utilization of link passwords. A link password is for a specific first user function request result which must be interactively entered by the user prior to the ability to display a document result. All of the above methods of authentication encrypts the authentication information within the resultant URL links and subsequently automatically propagates the authentication information to successive URL requests.

BRIEF DESCRIPTION OF THE DRAWINGS

A preferred embodiment of the present invention is described herein with reference to the drawings wherein.

DETAILED DESCRIPTION OF THE PREFERRED EMBODIMENT

While the invention is susceptible of embodiment in many different forms, there will be described herein in detail, preferred and alternate embodiments of the present invention. It should be understood, however, that the present disclosure is to be considered an exemplification of the principles of the invention and is not intended to limit the spirit and scope of the invention and/or claims of the embodiments illustrated.

A preferred embodiment of the present invention is shown as a method of creating durable URL links dependent upon certain user functions. The preferred embodiment provides a method of performing Internet and/or Intranet related user functions within a web-enabled information system.

Figure 1:
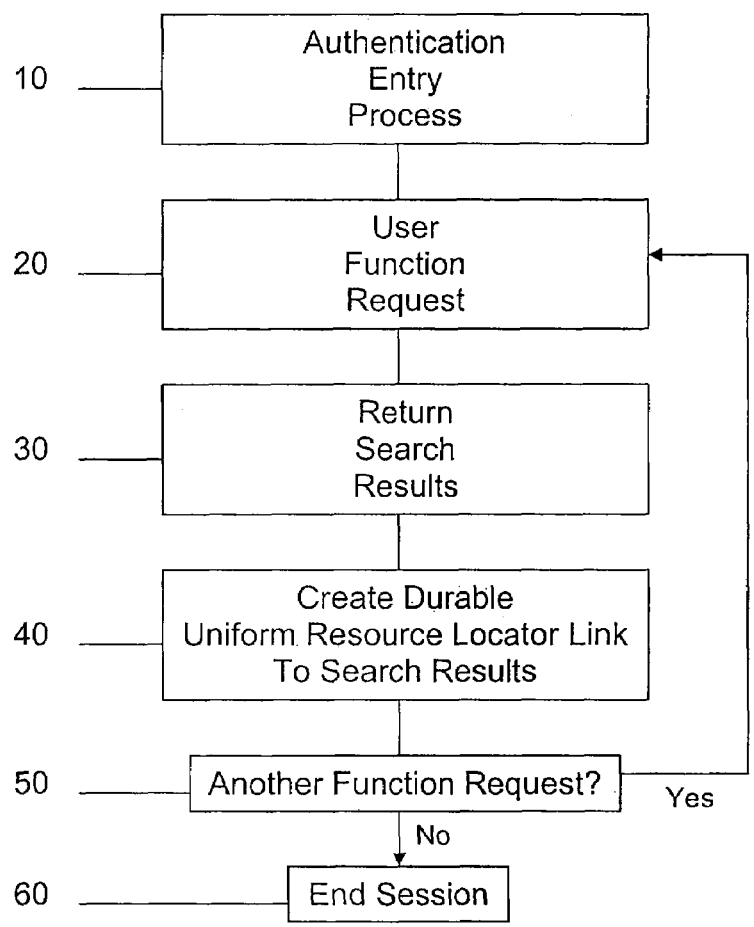
FIG. 1 is a flow chart depicting the method of the present invention.
Figure 2:
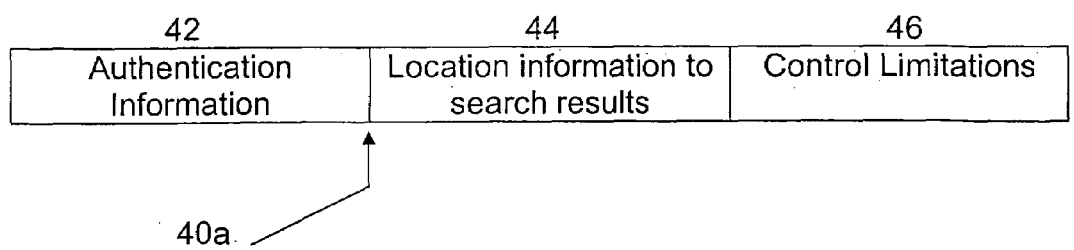
FIG. 2 is a box diagram depicting the information contained within the durable Uniform Resource Locator links.

The preferred embodiment process is conducted as described herein, with reference to FIGS. 1 and 2. The user begins a session by first authenticating into the web-enabled service via a delivered user interface, step 10. The preferred embodiment of the present invention performs the authentication process by using a typical login name and password system. It is to be understood, of course, that any method of authentication, such as biometrics, voice recognition, and cookies, can be equivalently used. After the user has authenticated within the user interface, the user will conduct a first user function request, step 20. This function can be any type of typical user function, such as search for a document by association, search by keyword, search by publication, search by author, search by date and the like. The type of functions that may be performed by the user is infinite in detail. This first user function will then return search results, step 30, and create a first URL link to the search results, step 40. The URL link 40a will contain document location information 44 for a list of search results along with the user's authentication information 42. The preferred embodiment encrypts the underlying URL link information to prevent unauthorized access and alteration.

The preferred embodiment will provide encrypted authorization and authentication information which do not need the addition of a GUI authorization or authentication. The durable links that are encrypted in these URLs will contain the searched for references and retrieval locations, but will also include the authorization and authentication information without the need to open up a new graphic user interface.

The user can then perform successive user functions, step 50, either dependent or independent of the first user function. Each successive user function will not destroy or alter any previous user function without the user's express input for doing so. For example, a successive user function may entail a document request based upon the first user function, or it may entail a new search function. However, each successive user function will not require the user to re-authenticate within the interface because the authentication information is already contained within the first user function URL link information, and will be copied or otherwise transferred to each successive URL at step 40. As such, each successive user function, be it a search or document request, will incorporate the user's authentication information within each search result. Thus, the successive user function results are equivalent in structure and character as the first user function results, as illustrated in FIG. 2.

The present invention will also allow for a meta linking table to be created. The meta linking table would contain unique information and entries for each durable link that exists, and for each durable link that is created. The table maps out the durable links with the locations of the content or search results to which they refer, allowing the content to be moved around, and for products of these durable links to be changed without breaking the durable link.

Further, the present invention allows for a mechanism whereby the end user possess the ability to create Master Links. These Master links would be created without the need for specific search parameters, effectively creating a generic durable link base. The durable link base would only contain the necessary information needed to carry out any subsequent searches, such as certification, and authentication information but no actual search parameters. Users can then use the durable links base to create a large number of specific searches based on the master link without having to regenerate each durable link in a separate process, or to continually re-authenticate or create new durable links.

The preferred embodiment of the present invention allows the web-enabled system or web-enabled system administrator to control access to the URL links. This is accomplished based upon the addition of control limitations 46 to the incorporated authentication information 42 and location information 44 within the URL link 40a. The preferred embodiment allows the web-enabled service administrator to control access to information based upon typical Internet Protocol masking. This will allow the administrator to control access both internally and externally, if such access is required. The preferred embodiment also allows the web-enabled service to control access by time limitations. This can be date or time control points wherein the information incorporated within the URL link is valid only for certain designated times. If the URL link is accessed outside of that time limit, it will be invalidated and inaccessible. It is to be understood, of course, that alternate methods of access of control can be used.

The preferred embodiment of the present invention further incorporates an automated system process management routine which designates the system web-enabled functions to system components with the least amount of awaiting process function, thus enhancing the over-all system response speed and functionality.

The foregoing specification describes only the preferred embodiment of the invention as shown. Other embodiments besides the above may be articulated as well. The terms and expressions therefore serve only to describe the invention by example only and not to limit the invention. It is expected that others will perceive differences, which while differing from the foregoing, do not depart from the spirit and scope of the invention herein described and claimed.

What is claimed is:

1. A method of performing authenticated web-enabled functions, comprising the steps of:

authenticating a user on a web-enabled service with a user authentication;

receiving a first user function request on said web-enabled service;

returning a first user function request result;

creating a first Uniform Resource Locator link derived from said first user function request, and incorporating said user authentication and said first user function request result within said first Uniform Resource Locator link;
preserving said first Uniform Resource Locator link;
receiving a successive user function request without requiring said user to re-authenticate;
returning a successive user function request result; and
creating a successive Uniform Resource Locator link derived from said successive user function request, and incorporating said user authentication contained in said first Uniform Resource Locator link and said successive user function request result within said successive Uniform Resource Locator link;
wherein said successive user function request does not alter said first Uniform Resource Locator link.

2. A method of performing authenticated web-enabled functions comprising the steps of:
authenticating a user on a web-enabled service with a user authentication;
receiving a first user function request on said web-enabled service;
returning a first user function request result;
creating a first Uniform Resource Locator link derived from said first user function request, and incorporating said user authentication and said first user function request result within said first Uniform Resource Locator link;
preserving said first Uniform Resource Locator link;
receiving a successive user function request without requiring said user to re-authenticate;
returning a successive user function request result;
creating a successive Uniform Resource Locator link derived from said successive user function request, and incorporating said user authentication contained in said first Uniform Resource Locator link and said successive user function request result within said successive Uniform Resource Locator link; and
receiving multiple subsequent successive user function requests without requiring said user to re-authenticate;
returning multiple subsequent successive user function request results; and
creating multiple subsequent successive Uniform Resource Locator links, each incorporating said user authentication obtained from the successive Uniform Resource Locator link;
wherein said multiple subsequent successive user function requests do not alter previously created Uniform Resource Locator link.

3. A method for creating durable web-enabled Uniform Resource Locator links, comprising the steps of:
receiving authentication information to begin a session;
performing a first user function request;
returning first user function request results;
creating a first Uniform Resource Locator link to said first user function request results, the first Uniform Resource Locator link incorporating the authentication information; and
performing at least one subsequent user function request without having to re-authenticate and without affecting access to said first Uniform Resource Locator link.

4. The method as claimed in claim 3, further comprising the step of creating a subsequent Uniform Resource Locator link corresponding to each subsequent user function request, wherein the subsequent Uniform Resource Locator link incorporates the authentication information.

5. The method as claimed in claim 4, further comprising the step of allowing access to each Uniform Resource Locator link created at any time during said session.

6. The method as claimed in claim 3 wherein said step of creating a first Uniform Resource Locator link to said first user function request results comprises the steps of:
providing location information to said first user function request results; and
attaching encrypted authentication information to said location information.

7. The method as claimed in claim 6 wherein said step of creating a first Uniform Resource Locator link to said first user function request results further comprises the step of attaching control limitations to said location information.

* * * * *